United States Patent [19]

Kleisath

[11] Patent Number: 4,705,283
[45] Date of Patent: Nov. 10, 1987

[54] ELECTRICIANS WIRE SPOOL CARRIER

[76] Inventor: Stanley N. Kleisath, 13615 28th St., NE., Lake Stevens, Wash. 98258

[21] Appl. No.: 712,214

[22] Filed: Mar. 15, 1985

[51] Int. Cl.⁴ .............................................. B62B 1/06
[52] U.S. Cl. .......................... 280/47.12; 242/86.5 R; 280/47.24; 414/457; 414/778; 414/910
[58] Field of Search ............... 414/457, 458, 910, 911, 414/444, 490, 778; 242/86.5; 280/47.12, 47.24

[56] References Cited

U.S. PATENT DOCUMENTS

| | | | |
|---|---|---|---|
| 337,870 | 3/1886 | Roberts | 414/457 |
| 780,777 | 1/1905 | Colling | 414/457 |
| 1,168,946 | 1/1916 | Leo | 280/47.12 X |
| 1,510,456 | 10/1924 | Cadwalader | 280/47.12 X |
| 1,799,659 | 4/1931 | Watson et al. | 280/47.12 |
| 2,477,871 | 8/1949 | Grogan et al. | 414/911 X |
| 2,705,114 | 3/1955 | Worsham | 242/86.5 R |
| 3,606,371 | 9/1971 | Rousseau et al. | 414/457 X |
| 3,856,230 | 12/1974 | Zimmer | 242/86.5 R |
| 3,860,193 | 1/1975 | Green | 242/86.5 R |
| 3,891,106 | 6/1975 | Alcanzare | 414/458 X |

FOREIGN PATENT DOCUMENTS

| | | | |
|---|---|---|---|
| 876360 | 3/1953 | Fed. Rep. of Germany | 414/444 |
| 997556 | 1/1952 | France | 414/457 |

Primary Examiner—Joseph E. Valenza
Assistant Examiner—David A. Bucci
Attorney, Agent, or Firm—Dowrey & Cross

[57] ABSTRACT

The present invention is a hand truck for lifting and transporting one or more spools of electrical wire or the like, and for supporting the spools for unreeling. The truck includes a frame with a main spool support mounted thereon. The main spool support includes a pair of standards mounted on the support members and constructed to support a shaft therebetween upon which a main spool can be mounted. Webs with apertures for holding auxiliary spool support shafts are mounted along the support members.

8 Claims, 3 Drawing Figures

ELECTRICIANS WIRE SPOOL CARRIER

FIELD OF THE INVENTION

This invention relates to the field of racks and hand trucks for spools of electrical wire and the like.

BACKGROUND OF THE INVENTION

Wire used in the electrician's trade is supplied on spools of varied sizes. Some spools are several feet in diameter and weigh up to 800 pounds or more when full. Moving such heavy weights is a common source of injury. Other spools are considerably smaller, and may be six inches or less in diameter.

Safely transporting a large spool about a work site and unreeling wire from the spool are difficult without a suitable cart or hand truck and a rack to support the spool. An electrician may also need several smaller spools at hand while working with a large spsool. While hand trucks suitable for small spools are available, a need has arisen for a hand truck which can lift, support and transport a large main spool, along with several small auxiliary spools, and which can also serve as a support rack while wire is unreeled from the spools.

SUMMARY OF THE INVENTION

The present invention is a hand truck for lifting and transporting one or more spools of electrical wire or the like, and for supporting the spools for unreeling. The truck includes a frame with a main spool support mounted thereon. The frame includes an open-ended spool carrying yoke formed from two parallel support members joined by a crossbar. Wheels are mounted on the support members adjacent the open end of the yoke and depending therefrom. The main spool support includes a pair of standards mounted on the support members over the wheels. The upper end of each standard is constructed to support a shaft upon which a main spool can be mounted.

Each standard is mounted in a base which holds the standard in a position in which the weight of the main spool will be transferred to the frame when the frame is lowered to a load-bearing position, and the center of gravity of the main spool is located over a point intermediate the ends of the support members when the frame is at its lowermost resting position. Webs with apertures formed therein are mounted along the lengths of the support members to carry one or more auxiliary spool-carrying shafts, so that several spools can be carried at once.

The invention provides an apparatus which serves both as a hand truck and also as a stable support rack for one or more wire spools. This hand truck is compact, inexpensive to manufacture, and safe, enabling one worker to lift and transport a heavy wire spool without the risk of injury.

DETAILED DESCRIPTION OF A PREFERRED EMBODIMENT

Figure 1:
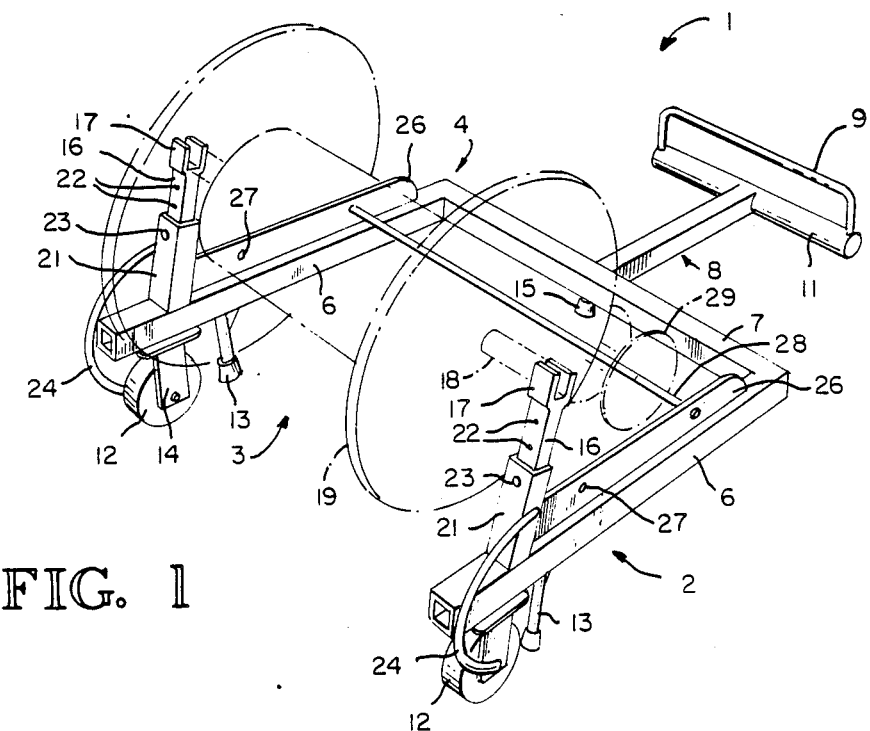
FIG. 1 is a perspective view of a preferred embodiment of the invention.
Figure 2:
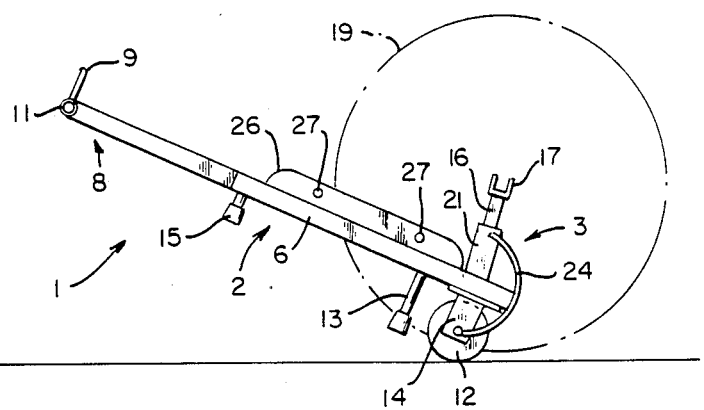
FIG. 2 is a side view of the FIG. 1 embodiment positioned to lift and transport a spool.
Figure 3:
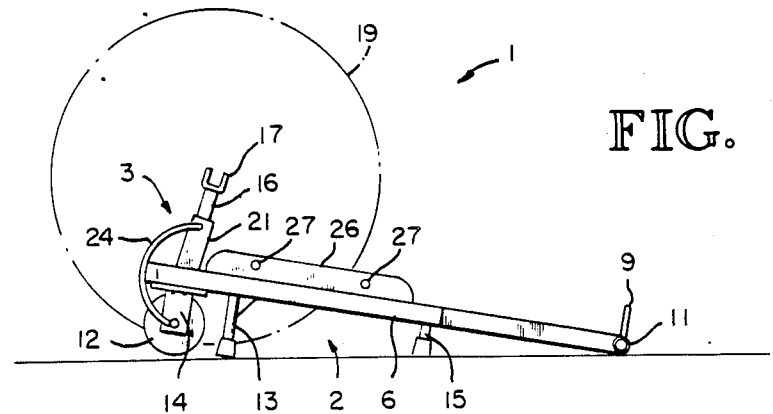
FIG. 3 is a side view of the FIG. 1 embodiment positioned to support a spool for unreeling.

Referring to FIGS. 1, 2 and 3, a hand truck 1 according to a preferred embodiment of the present invention includes a frame 2 which carries a main spool support 3. The frame 2 includes a generally planar open-ended yoke 4 formed from two support members 6 joined by a crossbar 7. The support members 6 and crossbar 7 are preferably constructed of lengths of square steel tubing joined together by welding. A handle 8 extends from the center of the crossbar 7 in the general plane of the yoke 4. For the user's convenience, the handle 8 may include two paallel handlebars 9, 11. Wheels 12 are mounted on the lower sides of the support members 6 near the open end of the yoke 4 on suitable wheel bearings held in wheel brackets 14.

A pair of support pegs 13 are mounted to the yoke 4 in proximity to the wheels 12. These pegs 13, which are preferably rubbertipped pegs bolted to the frame 2, support the hand truck 1 and hold it stationary when it is lowered to the ground as shown in FIG. 3 for use as a support rack. Alternatively, any suitable brake mechanism may be provided on the wheels 12 to hold the hand truck 1 stationary when desired. A third support peg 15 is preferably joined to the underside of the crossbar 7. This peg 15 supports the weight of the frame 2 when it is lowered as shown in FIG. 3, to prevent the handle 8 from buckling under the load at the point where it connects to the crossbar 7.

The main spool support 3 includes a pair of standards 16 mounted near the ends of each support member 6 over the wheels 12. Channel blocks 17 or other suitable means for engaging a shaft 18 are connected to, or formed as an integral part of, the upper ends of the standards 16. In a preferred embodiment, each of the standards 16 will be constructed of square steel tubing telescopingly mounted in a base 21 which also may be constructed of square steel tubing welded or otherwise suitably affixed to the support member 6. The standard mounting bases 21 hold the standards 16 at an angle of slightly less than 90° from the support members 6, so that the weight of the main spool 19 carried between the standards 16 will be transferred to the frame 2 when the truck 1 is shifted to a load-bearing position as shown in FIG. 2. When the truck 1 is placed in its lowermost position to act as a support rack as shown in FIG. 3, the center of gravity of the main spool 19 lies over a point along the support members 6 between the wheels 12 and the crossbar 7. With the center of gravity of the main spool 19 positioned intermediate the ends of the support members 6, the truck 1 is stable. It will not tip forward as wire is unreeled from the main spool, since the center of gravity of the spool lies on the opposite side of the wheels, which define the fulcrum about which the truck 1 moves when tilted or tipped. In a preferred embodiment, each standard 16 has a series of holes 22 along its length and is secured to the base 21 with a pin 23. The overall height of the telescoping standards 16 is thus adjustable to accommodate spools of differing diameters.

A rocker bar 24 is connected to the front of each support member 6 between the base 21 and wheel bracket 14. In a preferred embodiment the rocker bars 24 are curved steel rods or tubes with their ends welded to the base 21 and wheel bracket 14, and their midpoints welded to the outermost ends of the support members 6. The rocker bars 24 support the frame 2 when it is raised to engage the ends of the main spool support shaft 18 to provide a stationary fulcrum for the lifting of a spool 19 to facilitate the initial lifting of the main spool 19. In addition, the rocker bars 24 will support the frame 2 in a raised position with the channel blocks 17 engaged with a main spool support shaft 18 through a main spool 19 resting on the ground.

Apertures 27 are provided along the lengths of the support members 6 to receive the ends of an auxiliary shaft 28, so that additional smaller spools 29 can be carried on the auxiliary shaft 28 without interfering with the main spool 19. In a preferred embodiment, these apertures 27 are formed in webs 26 constructed of flat steel plates which are welded on the upper side of each support member 6 between the standard 16 and crossbar 7. Two or more apertures 27 in each web 26 are advantageous in that they allow the carrying of two or more auxiliary shafts with several small spools on each, as an alternative to the carrying of a large main spool and a single auxiliary shaft bearing small spools.

The use of webs is advantageous in that it prevents weakening of the frame 2 by the formation of holes therein, it provides structural reinforcement of the support members 6, and, if the web 26 is extended and welded to the base 21, it will stabilize the position of the base 21 relative to the support member 6. In addition, the use of webs allows auxiliary shafts to be positioned above the plane of the yoke 4. As a result auxiliary shafts can be held higher in relation to the main spool support shaft 18. This extra height, along with that gained by standing the frame 2 in a raised position on the rocker bars 24, will in many cases make possible the unreeling of wire from a small spool 29 on an auxiliary shaft 28 without interference from the main spool 19.

In use, a shaft 18 is inserted through the center of a main spool 19. The height of the standards 16 is adjusted to accommodate the diameter of the main spool 19, and the frame 2 is tilted up onto the rocker bars 24 to engage the channel blocks 17 with the ends of the shaft 18. The frame 2 is then tilted down to lift the spool 19 off the ground, as shown in FIG. 2. When the spool 19 is transported to the desired location, the frame 2 is lowered until it rests on the support pegs 13 as shown in FIG. 3. The pegs 13 hold the frame 2 stationary, with the main spool 19 above ground level. As shown in FIG. 1, one or more additional spools 29 may be supported on auxiliary shafts 28 supported by the webs 26.

While the invention has been described with respect to a particular preferred embodiment used in a particular environment, this has been done for illustrative purposes only. Variations from the preferred embodiment may lie within the scope of the invention.

What is claimed is:

1. An apparatus for lifting, supporting and transporting spools of electrical wire and the like comprising: a frame and main spool-supporting means mounted on said frame;

said frame comprising a pair of parallel support members, a cross member connected to said support members to provide an open-ended spool-carrying yoke, a lifting and transporting handle connected to said cross member a pair of wheel brackets mounted on said support members adjacent the open end of said yoke and depending therefrom, and a pair of wheels mounted on said brackets, said main spool supporting means comprising a pair of standards mounted on said support members adjacent the open end of said yoke above the wheels, the upper end of each standard being so constructed and arranged to carry and support a main spool carrying shaft, means mounting each standard to a respective support member such that the weight of a main spool carried between the standards is transferred to the frame when the upper ends of said standard are engaged with a spool-carrying shaft and the frame is shifted from an upright non-load bearing position to a lowered load bearing position and such that the center of gravity of the main spool is located intermediate the ends of the support members when the frame is in its lowermost resting position, such mounting means being so constructed and arranged to permit the standards to be extended and retracted to enable said frame to accommodate main spools of varying diameters;

web means connected to said support members and constructed and arranged to carry an auxiliary spool-carrying shaft without interfering with a main spool carried by standards; and curvilinear rocker members mounted to each of said support members at the open end of said yoke outboard of said wheel brackets to provide maximum clearance for a main spool and for supporting and stabilizing said frame in a raised position when said upper ends of said standards are engaged with a main spool-carrying shaft to lift a main spool off the ground, said rocker members having their opposite ends rigidly connected to said standards and said wheel brackets respectively and being rigidly connected to the ends of said support members intermediate said opposite ends thereof.

2. An apparatus according to claim 1 wherein said mounting means are configured to mount said standards such that the center of gravity of a main spool carried between said standards is located over a point along said support members between said wheels and said cross member when said frame is in its lowermost resting position.

3. An apparatus according to claim 2 further comprising a pair of support pegs mounted to said frame in proximity to said wheels for supporting said frame when said frame is in its lowermost resting position.

4. An apparatus according to claim 1 wherein said standards are telescopingly engaged in said mounting means.

5. Apparatus for lifting, supporting and transporting wire spools and the like comprising;

frame means including substantially parallel support members forming an open-ended spool-carrying yoke, said frame means including lifting handle means and support wheel means mounted on said support members adjacent the open end of said yoke, spool support means comprising a pair of spool shaft receiving standards mounted respectively on said support members adjacent the open end of said yoke, said standards being so constructed and arranged to carry and support a spool with the center of gravity thereof being located over a point intermediate the ends of the support members when the frame is in a lowered position, and curvilinear rocker members connected intermediate the ends thereof to each of said support members at the open end of said yoke, said rocker members having their opposite ends connected respectively to said standards and said support wheel means, whereby said rocker bars support said frame means when in a raised position to engage said standards with a spool support shaft to provide a stationary fulcrum for initially lifting the spool.

6. Apparatus of claim 5 wherein said standards include;

spool shaft engaging elements, and means for connecting said elements to said standards for extension and retraction to accommodate spools of varying diameters.

7. Apparatus of claim 6 wherein said frame includes a cross bar connected between said support members remote from the open end of said yoke, said standards are located on said support members approximately opposite said support wheel means, and means mounting said standards such that the center of gravity of a spool carried between said standards is located over a point between said support wheels and said cross member.

8. Apparatus of claim 5 including;

auxiliary shaft support means on said support members for carrying an auxliary spool-carrying shaft without interfering with a main spool carried by said standards,

* * * * *